(12) United States Patent
Merry et al.

(10) Patent No.: US 8,943,839 B2
(45) Date of Patent: Feb. 3, 2015

(54) GAS TURBINE ENGINE GENERATOR SWITCHABLE DRIVE

(75) Inventors: Brian D. Merry, Andover, CT (US); Gabriel L. Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 826 days.

(21) Appl. No.: 13/218,863

(22) Filed: Aug. 26, 2011

(65) Prior Publication Data
US 2013/0047626 A1 Feb. 28, 2013

(51) Int. Cl.
  F02C 7/26 (2006.01)
  F02C 7/32 (2006.01)
  F02C 7/275 (2006.01)

(52) U.S. Cl.
  CPC . *F02C 7/32* (2013.01); *F02C 7/275* (2013.01); F05D 2250/41 (2013.01); F05D 2220/76 (2013.01); F05D 2250/34 (2013.01); F05D 2260/36 (2013.01); F05D 2260/4031 (2013.01)
  USPC ............... 60/786; 60/778; 60/788; 60/39.163

(58) Field of Classification Search
  USPC ............................... 60/39.163, 768, 778, 788
  See application file for complete search history.

(56) References Cited

U.S. PATENT DOCUMENTS

| | | | |
|---|---|---|---|
| 2,693,675 A * | 11/1954 | Schaffer | 60/39.281 |
| 4,269,027 A * | 5/1981 | Mattson et al. | 60/774 |
| 7,055,330 B2 | 6/2006 | Miller | |
| 7,552,591 B2 | 6/2009 | Bart et al. | |
| 7,698,884 B2 * | 4/2010 | Maguire et al. | 60/39.163 |
| 7,997,085 B2 * | 8/2011 | Moniz et al. | 60/788 |
| 2008/0148881 A1* | 6/2008 | Moniz et al. | 74/15.6 |
| 2009/0049841 A1 | 2/2009 | Pierrot et al. | |
| 2009/0064683 A1* | 3/2009 | Moniz et al. | 60/792 |
| 2009/0205341 A1 | 8/2009 | Muldoon | |
| 2009/0290976 A1* | 11/2009 | Suciu et al. | 415/122.1 |
| 2011/0154827 A1 | 6/2011 | Ress, Jr. et al. | |

* cited by examiner

*Primary Examiner* — Craig Kim
(74) *Attorney, Agent, or Firm* — Kinney & Lange, P.A.

(57) ABSTRACT

A gas turbine engine includes a first spool, a first gear system connected to and driven by the first spool, a second spool, and a second gear system connected to and driven by the second spool. A first starter-generator has a first shaft with a switchable coupling connected to the first shaft. The switchable coupling selectively couples the first starter-generator to the first gear system when the switchable coupling is in a first position and selectively couples the first starter-generator to the second gear system when the switchable coupling is in a second position.

18 Claims, 4 Drawing Sheets

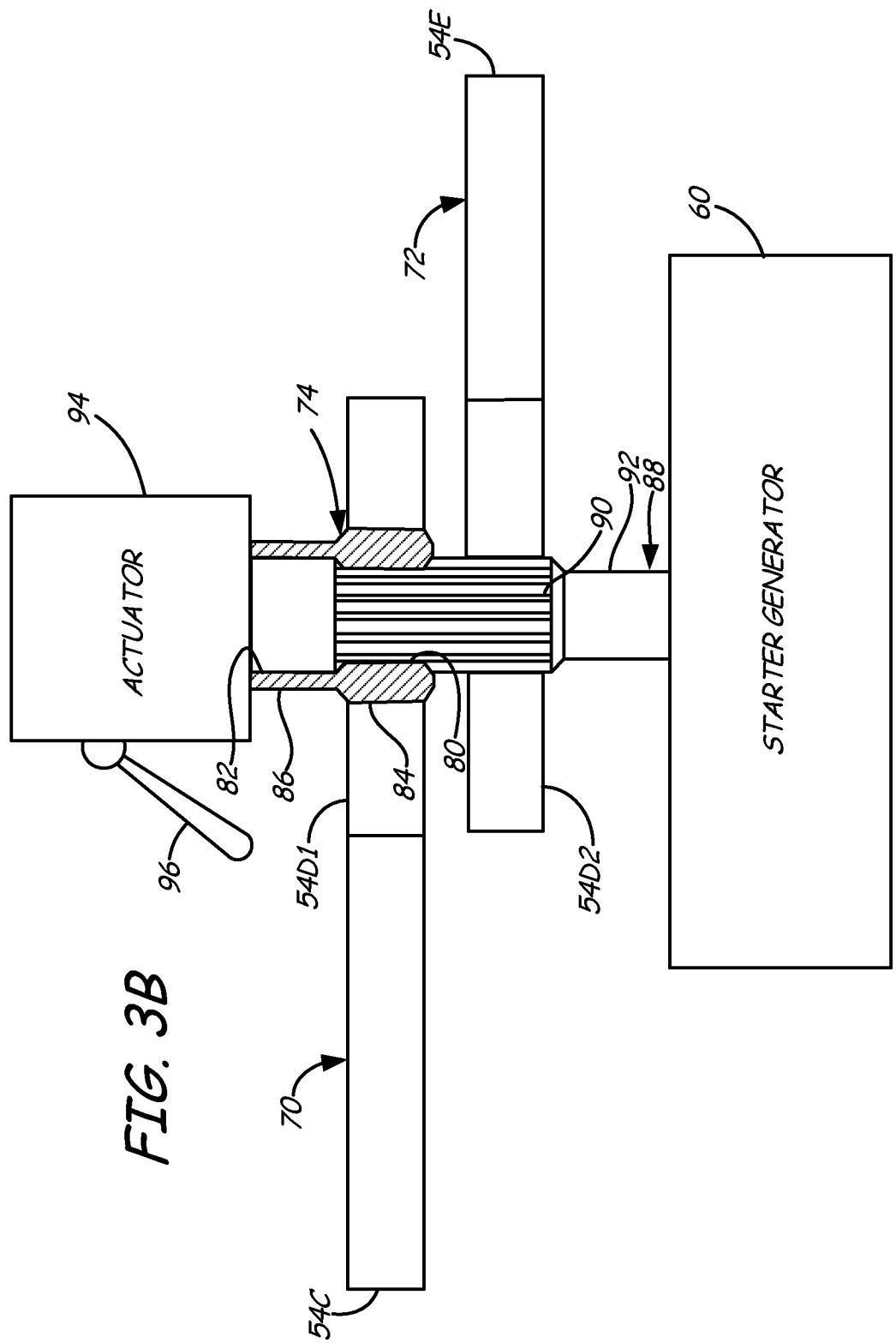

GAS TURBINE ENGINE GENERATOR SWITCHABLE DRIVE

BACKGROUND

The present invention relates to gas turbine engines, and in particular, to starter-generators used on gas turbine engines. Gas turbine engines typically include one or more spools that rotate to generate thrust and/or to drive accessories. Such accessories often include one or more electrical generators, fuel pumps, oil pumps, hydraulic pumps, rotor breaks, engine starters, and/or other accessories. In some gas turbine engines, the engine starter is combined with an electrical generator to form a combination starter-generator.

In gas turbine engines with a starter-generator and more than one spool, the starter-generator is often connected to and driven by the high pressure spool. That starter-generator can then be used for rotating the high pressure spool for starting the engine. If, however, that starter-generator fails, it will not be able to start the engine until it is repaired. A starter-generator can instead be connected to and driven by the low pressure spool. However, a starter-generator connected exclusively to the low pressure spool will be unable to rotate the high pressure spool for starting.

SUMMARY

According to the present invention, a gas turbine engine includes a first spool, a first gear system connected to and driven by the first spool, a second spool, and a second gear system connected to and driven by the second spool. A first starter-generator has a first shaft with a switchable coupling connected to the first shaft. The switchable coupling selectively couples the first starter-generator to the first gear system when the switchable coupling is in a first position and selectively couples the first starter-generator to the second gear system when the switchable coupling is in a second position.

Another embodiment of the present invention is a method for operating a gas turbine engine. The method includes driving a first starter-generator via a first gear system connected to a first spool, driving a second starter-generator via a second gear system connected to a second spool, and actuating a switchable coupling to disconnect the first starter-generator from the first gear system and to connect the first starter-generator to the second gear system.

BRIEF DESCRIPTION OF THE DRAWINGS

FIG. 3B is a schematic view of gears shown in FIG. 2 in a second position.

DETAILED DESCRIPTION

Figure 1:
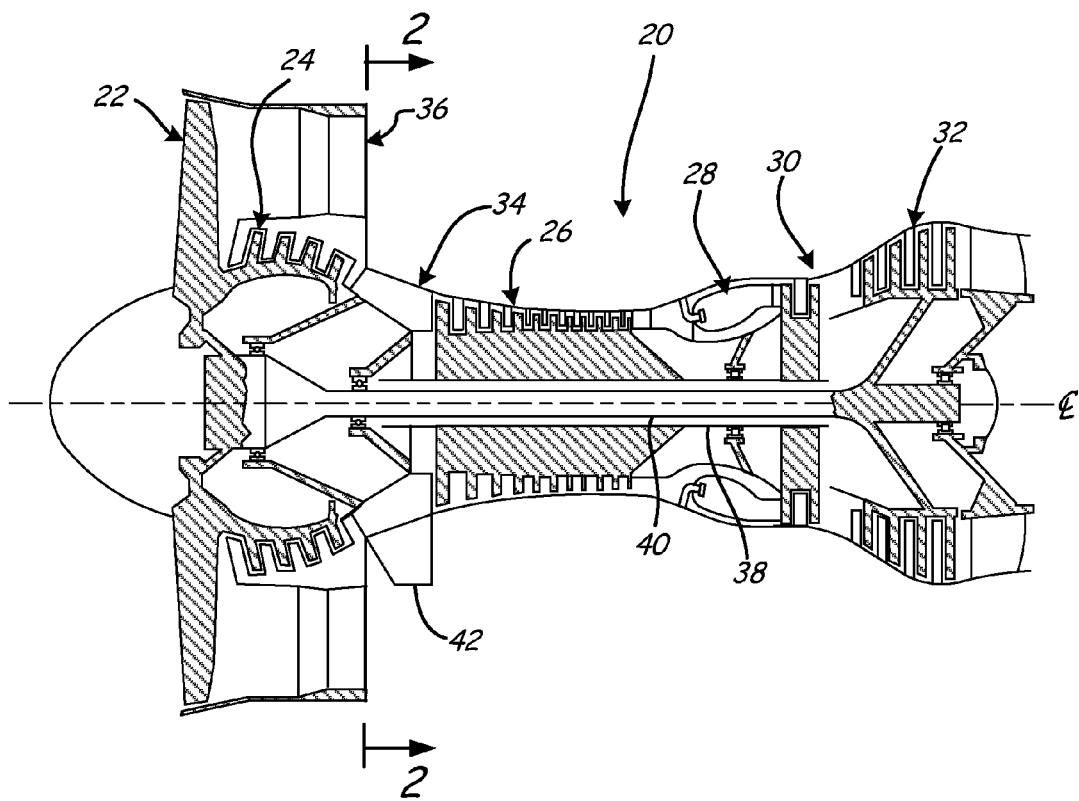
FIG. 1 is a schematic cross-sectional view of a gas turbine engine.

FIG. 1 is a schematic cross-sectional view of gas turbine engine 20. Gas turbine engine 20 includes fan 22, low-pressure compressor (LPC) section 24, high-pressure compressor (HPC) section 26, combustor assembly 28, high-pressure turbine (HPT) section 30, low-pressure turbine (LPT) section 32, intermediate case assembly 34, and bypass duct 36 all arranged about engine centerline $C_L$. High pressure spool 38 extends from HPC section 26 to HPT section 30. Low pressure spool 40 extends from LPC section 24 to LPT section 32. The general construction and operation of gas turbine engines is well-known in the art, and therefore further discussion here is unnecessary. It should be noted, however, that engine 20 is shown in FIG. 1 merely by way of example and not limitation. The present invention is also applicable to a variety of other gas turbine engine configurations such as a turboprop engine or an engine with a fan connected to a spool via gearing, for example. In the illustrated embodiment, accessory gearbox 42 is connected to gas turbine engine 20 at intermediate case 34 as further described with respect to FIG. 2.

Figure 2:
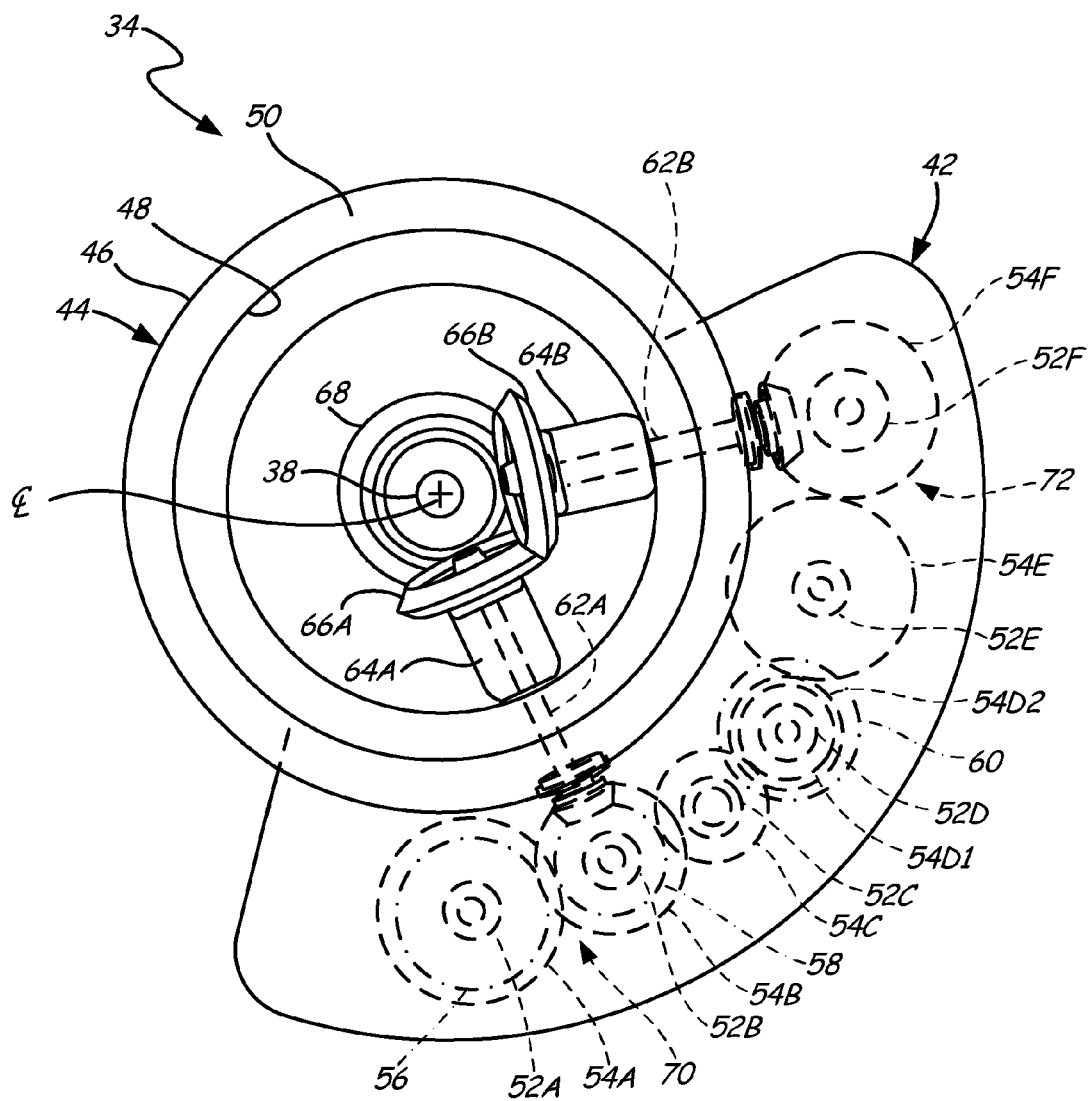
FIG. 2 is a front sectional view of the intermediate case assembly of FIG. 1, taken along line 2-2 of FIG. 1.

FIG. 2 is a front sectional view of intermediate case assembly 34, taken along line 2-2 of FIG. 1. As shown in FIG. 2 intermediate case assembly 34 includes gearbox 42 attached to transition duct 44. Transition duct 44 includes outer diameter boundary wall 46 and inner diameter boundary wall 48 defining annular flowpath 50. Transition duct 44 is located between LPC 24 and HPC 26 (shown in FIG. 1) with flowpath 50 defined therebetween. Outer diameter boundary wall 46 and inner diameter boundary wall 48 of transition duct 44 each have a substantially frusto-conical shape, with a greater diameter at a forward inlet region than an aft outlet region. In the illustrated embodiment, outer diameter boundary wall 46 provides a shared wall where gearbox 42 is connected to transition duct 44. Outer diameter boundary wall 46 separates the interior cavity of gearbox 42 from flowpath 50. In alternative embodiments, gearbox 42 can be shaped and constructed differently than illustrated.

Gearbox 42 has mounting spaces 52A, 52B, 52C, 52D, 52E, and 52F for mounting gears 54A, 54B, 54C, 54D1, 54D2, 54E, and 54F and various accessories, including oil pump 56, starter-generator 58, and starter-generator 60. Gears 54A, 54B, 54C, 54D1, 54D2, 54E, and 54F are shown in phantom inside gearbox 42. Oil pump 56, starter-generator 58, and starter-generator 60 are shown in phantom behind gearbox 42, and are shown schematically to show position. Oil pump 56 is mounted at mounting space 52A and is connected to and driven by gear 54A. Starter-generator 58 is mounted at mounting space 52B and is connected to and driven by gear 54B. Starter-generator 60 is mounted at mounting space 52D and is driven by one of gears 54D1 and 54D2 (which are also mounted at mounting space 52D) as further described with respect to FIGS. 3A and 3B.

Tower shafts 62A and 62B are surrounded by sleeves 64A and 64B, respectively. Tower shaft 62A extends across flowpath 50, through sleeve 64A, and terminates at bevel gear 66A, which connects to high pressure spool 38 via bevel gear 68. Tower shaft 62A, bevel gear 66A, bevel gear 68, and gears 54A, 54B, 54C, and 54D1 combine to form gear system 70, which is connected to and driven by high pressure spool 38. Tower shaft 62B extends across flowpath 50, through sleeve 64B, and terminates at bevel gear 66B, which connects to low pressure spool 40 (shown in FIG. 1) via another bevel gear (not shown). Tower shaft 62B, bevel gear 66B, and gears 54D2, 54E, and 54F combine to form gear system 72, which is connected to and driven by low pressure spool 40. Coupling 74 is a switchable coupling that can be selectively coupled to either gear system 70 (through gear 54D1) or to gear system 72 (through gear 54D2) as further described with respect to FIGS. 3A and 3B. Gear system 70 is substantially independent from gear system 72. Gear system 70, gear system 72, and coupling 74 are all positioned substantially inside gearbox 42. In an alternative embodiment, gear systems 70 and 72 need not be positioned inside a common gearbox so long as starter-generator 60 can be selectively coupled to each of gear system 70 and gear system 72. In alternative embodiments, gear systems 70 and 72 can include gears and components in addition to and different than those illustrated and described herein.

Particular accessories can have particular positioning and speed requirements. Accessories can be driven by gear system 70 or gear system 72 as desired for particular applications. In one embodiment, a first set of accessories having similar power or speed requirements can be grouped together and connected to gear system 70 while a second set of accessories are grouped together and connected to gear system 72. In alternative embodiments, accessories and gear systems can be located at other locations according to fluid plumbing constraints, proximity of other engine components, or ease of access.

Figure 3A:
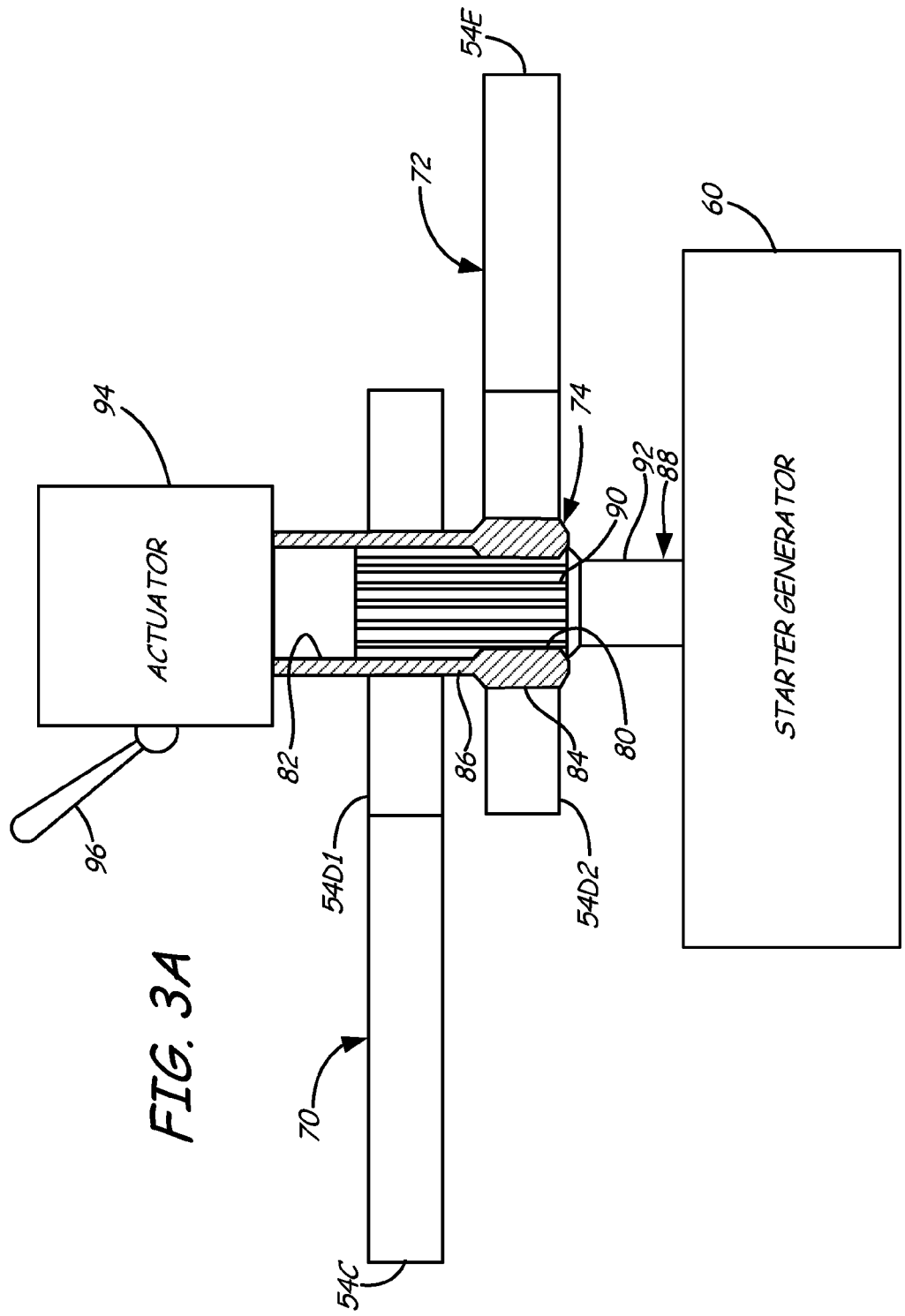
FIG. 3A is a schematic view of gears shown in FIG. 2 in a first position.

FIG. 3A is a schematic view of gears 54C, 54D1, 54D2, and 54E with coupling 74 in a first position. As shown in FIG. 3A, coupling 74 is a splined collar having splines 80 on its radially inner surface 82 and splines 84 on its radially outer surface 86. Starter-generator 60 has shaft 88 with splines 90 on its radially outer surface 92. Splines 80 are coupled to splines 90 such that coupling 74 rotates with shaft 88, and consequently, with starter-generator 60. Coupling 74 is aligned substantially concentrically with gears 54D1 and 54D2. In the first position, coupling 74 is aligned such that splines 84 are coupled to splines (not shown) of gear 54D2. Thus, starter-generator 60 is coupled to and driven by gear system 72 (shown in FIG. 2) when coupling 74 is in the first position. In alternative embodiments, gear 54D1, gear 54D2, and coupling 74 need not necessarily be concentric.

Actuator 94 is connected to coupling 74 for sliding coupling 74 between the first position (shown in FIG. 3A) and a second position (shown in FIG. 3B). Splines 80 can slide against splines 90 to allow coupling 74 to slide between the first and second positions. Actuator 94 is a hydraulic actuator which can automatically actuate coupling 74 between the first and second positions, for example at the push of a button by a pilot. In an alternative embodiment, actuator 94 can have mechanical lever 96 for manually switching coupling 74 between the first and second positions, for example by a mechanic.

FIG. 3B is schematic view of gears 54C, 54D1, 54D2, and 54E with coupling 74 in the second position. In the second position, coupling 74 is aligned such that splines 84 are coupled to splines (not shown) of gear 54D1. Thus, starter-generator 60 is coupled to and driven by gear system 70 (shown in FIG. 2) when coupling 74 is in the second position.

Under normal operating conditions, coupling 74 is in the first position (shown in FIG. 3A) such that starter-generator 60 is coupled to and driven by low pressure spool 40 (shown in FIG. 1) via gear system 72 (shown in FIG. 2); and starter generator 58 (shown in FIG. 2) is coupled to and driven by high pressure spool 38 (shown in FIGS. 1 and 2) via gear system 70. Thus, gas turbine engine 20 can generate electrical power via two starter-generators: starter-generator 60 as driven by low pressure spool 40 and starter-generator 58 as driven by high pressure spool 38. When gas turbine engine 20 needs to be started (on the ground) or restarted (in the air), starter-generator 58 can be used to drive high pressure spool 38 and start gas turbine engine 20.

If, however, starter-generator 58 has a failure or malfunction such that it is unable to start gas turbine engine 20, starter-generator 60 can be used instead. Actuator 94 will first move coupling 74 from its first position to its second position, thus disconnecting starter-generator 60 from gear system 72 and connecting starter-generator 60 to gear system 70. Then when gas turbine engine 20 needs to be started (on the ground) or restarted (in the air), starter-generator 60 can be used to drive high pressure spool 38 via gear system 70 and start gas turbine engine 20. After gas turbine engine 20 has been started, starter-generator 60 can remain connected to high pressure spool 38 for generating electric power. Gas turbine engine 20 can continue operating with only one functioning starter-generator until such time as starter-generator 58 can be repaired. After starter-generator 58 has been repaired, coupling 74 can be actuated to reconnect starter-generator 60 to gear system 72.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, gear systems 70 and 72 could be modified in a number of other ways so long as a switchable coupling selectively and suitably connects a starter generator to multiple gear systems.

The invention claimed is:

1. A gas turbine engine comprising:
   a first spool;
   a first gear system connected to and driven by the first spool;
   a second spool;
   a second gear system connected to and driven by the second spool;
   a first starter-generator having a first shaft with splines; and
   a splined collar connected to the first shaft for selectively coupling the first starter-generator to the first gear system when the splined collar is in a first position and selectively coupling the first starter-generator to the second gear system when the splined collar is in a second position.

2. The gas turbine engine of claim 1, and further comprising:
   a second starter-generator connected to and driven by the second gear system.

3. The gas turbine engine of claim 1, and further comprising:
   a mechanical lever connected to the splined collar for actuating the splined collar between the first and second positions.

4. The gas turbine engine of claim 1, and further comprising:
   a hydraulic actuator connected to the splined collar for actuating the splined collar between the first and second positions.

5. The gas turbine engine of claim 1, wherein the first gear system and the second gear system are substantially independent.

6. The gas turbine engine of claim 1, wherein the first gear system, the second gear system, and the splined collar are positioned substantially inside a common gearbox.

7. The gas turbine engine of claim 1, wherein the first gear system has a first gear, wherein the second gear system has a second gear, and wherein the first gear, the second gear, and the splined collar are substantially concentric.

8. The gas turbine engine of claim 1, wherein the first spool is a low pressure spool and the second spool is a high pressure spool.

9. The gas turbine engine of claim 8, and further comprising:

a first tower shaft connecting the first gear system to the low pressure spool; and a second tower shaft connecting the second gear system to the high pressure spool.

10. The gas turbine engine of claim 1, wherein the splined collar has splines on its radially outer surface for coupling to gears of the first and second gear systems.

11. A method for operating a gas turbine engine, the method comprising:

driving a first starter-generator via a first gear system connected to a first spool;

driving a second starter-generator via a second gear system connected to a second spool;

actuating a switchable coupling to disconnect the first starter-generator from the first gear system and to connect the first starter-generator to the second gear system; and wherein actuating the switchable coupling comprises sliding a splined collar along splines of a shaft of the first starter-generator.

12. The method of claim 11, and further comprising:

starting the gas turbine engine via the first starter-generator when the switchable coupling is connected to the second gear system; and starting the gas turbine engine via the second starter-generator when the switchable coupling is connected to the first gear system.

13. The method of claim 11, wherein actuating the switchable coupling comprises:

manually moving a lever connected the switchable coupling to move the switchable coupling.

14. The method of claim 11, wherein actuating the switchable coupling comprises:

moving a hydraulic actuator connected to the switchable coupling to move the switchable coupling.

15. The method of claim 11, wherein the switchable coupling is actuated to connect the first starter-generator to the second gear system in response to a failure of the second starter-generator.

16. The method of claim 15, wherein the switchable coupling is actuated to reconnect the first starter-generator to the first gear system in response to the second starter-generator having been repaired.

17. The method of claim 11, wherein the first spool is a low pressure spool and the second spool is a high pressure spool.

18. The method of claim 11, wherein the first gear system and the second gear system are substantially independent.

* * * * *